May 13, 1952 W. P. SCHMITTER 2,596,794
SPEED REDUCER
Filed May 24, 1948 4 Sheets-Sheet 1

INVENTOR.
Walter P. Schmitter
BY
Ralph W. Brown
ATTORNEY.

May 13, 1952  W. P. SCHMITTER  2,596,794
SPEED REDUCER
Filed May 24, 1948  4 Sheets-Sheet 2
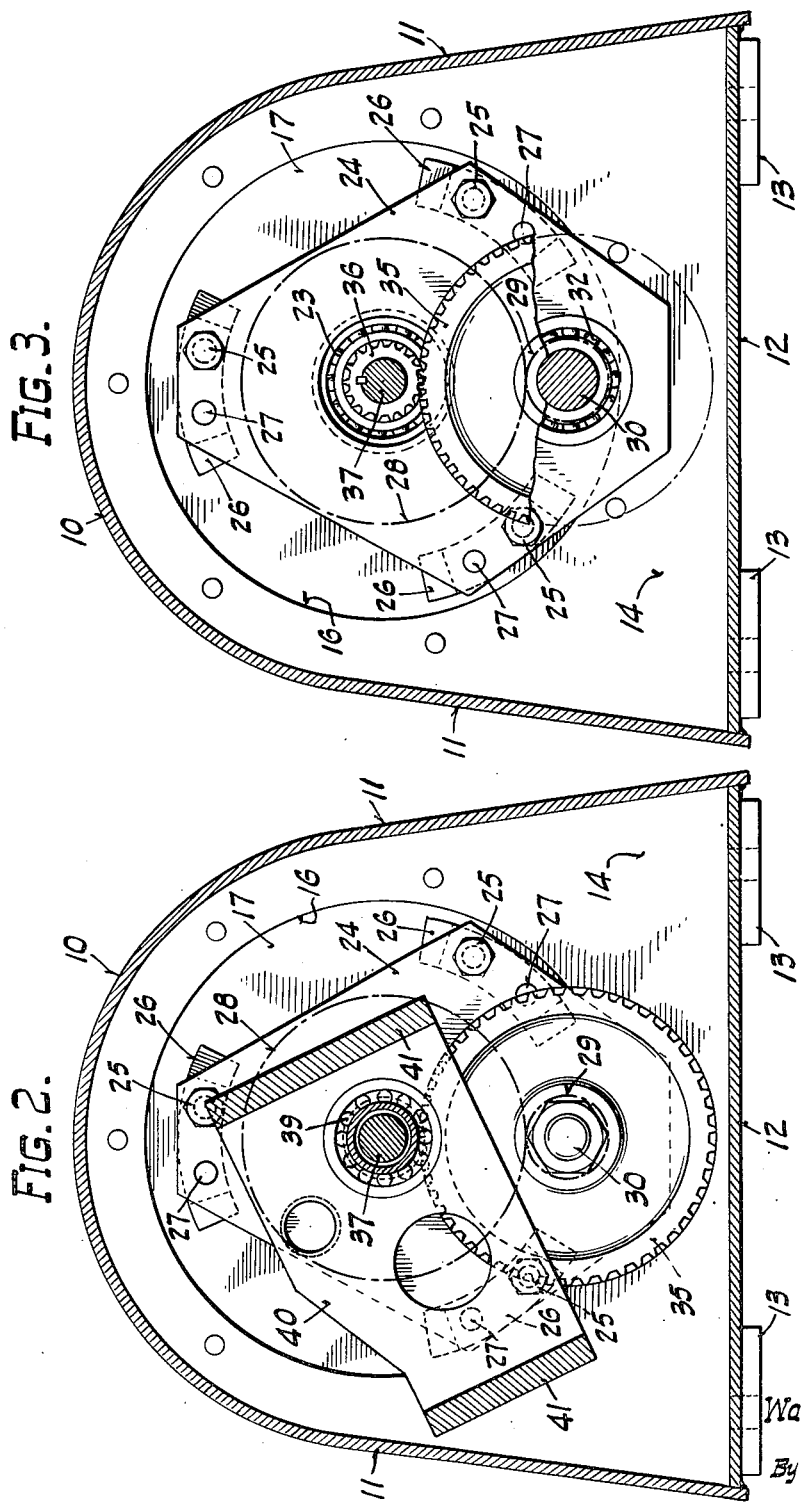
INVENTOR.
Walter P. Schmitter
By [signature]
ATTORNEY.

INVENTOR.
Walter P. Schmitter
BY
ATTORNEY.

May 13, 1952 W. P. SCHMITTER 2,596,794
SPEED REDUCER
Filed May 24, 1948 4 Sheets-Sheet 4
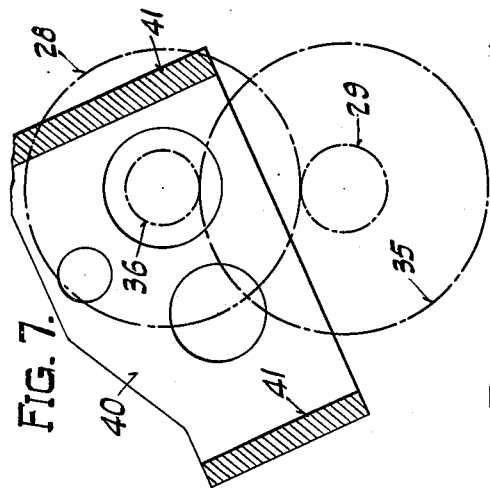
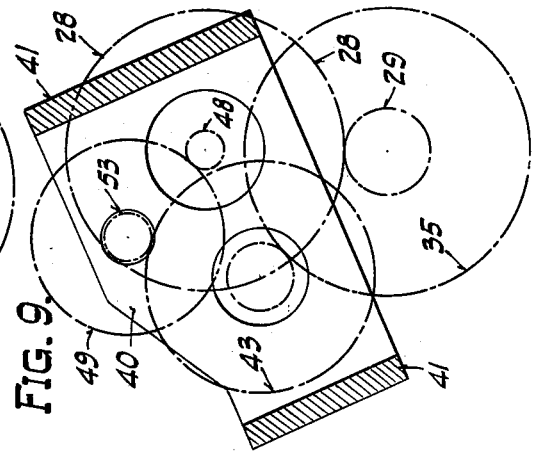
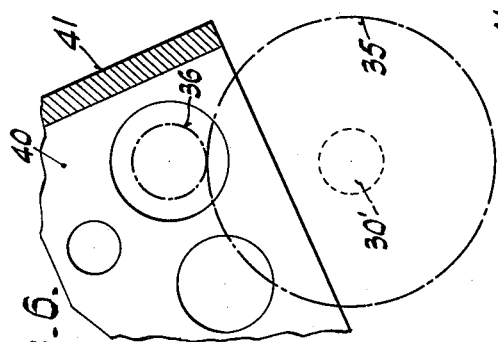
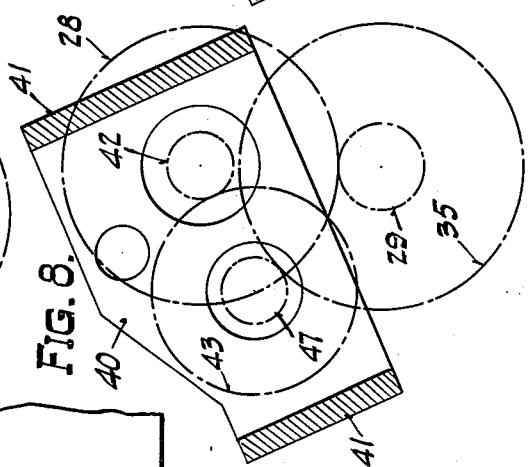
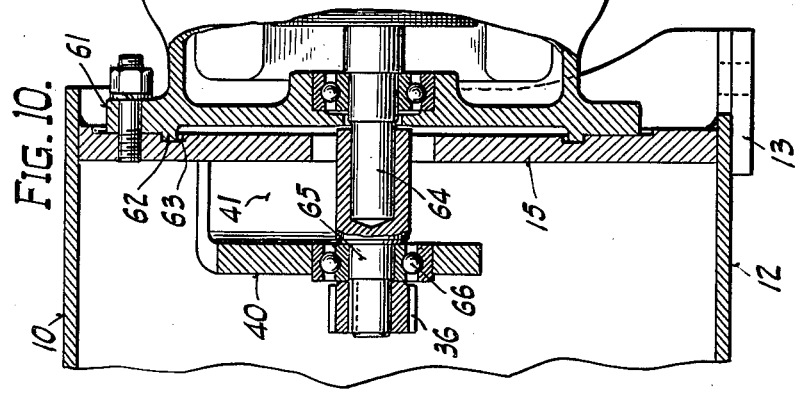
INVENTOR.
Walter P. Schmitter
BY
ATTORNEY.

Patented May 13, 1952

2,596,794

UNITED STATES PATENT OFFICE 2,596,794

SPEED REDUCER

Walter P. Schmitter, Wauwatosa, Wis., assignor to The Falk Corporation, Milwaukee, Wis., a corporation of Wisconsin Application May 24, 1948, Serial No. 28,839

10 Claims. (Cl. 74—421)

This invention relates to speed reducers.

Speed reducers are extensively used throughout the industrial arts as a means for transmitting power from a rotary driver to a driven mechanism to drive the latter at a rotary speed other than that of the driver. They have particular utility when included in modern electric motor drives for the purpose of effecting operation of the driven mechanism at the particular speed desired. Each commonly comprises a housed unit involving driving and driven shafts interconnected by gearing designed to satisfy the load, speed and other operating requirements of a particular installation. In some instances the housing provides support for the driving motor.

The economic production and supply of speed reducers capable of satisfying the individual requirements of various installations throughout the vast range and diversity of industrial applications presents a serious problem. Numerous sizes are necessary to satisfy the wide range of load requirements alone and, in addition, substantial variations in design are ordinarily required to satisfactorily provide for the wide range of individual speed requirements. In some cases, for instance, a relatively small difference in speed between the driver and driven mechanism may be readily accommodated by a speed reducer designed to provide a single stage reduction, involving a single pair of intermeshing gears, whereas in other instances the speed difference is such as to require a speed reducer designed to provide two, three or even four stages of reduction, involving rather complicated gear trains adequately supported. By reason of these conditions and others the number of different sizes and designs of speed reducers heretofore required to satisfy the wide range of industrial requirements have been so multiplied as to materially affect the unit cost of manufacture and to render it practically impossbile to maintain a supply adequate to promtply meet the various individual demands.

One object of the present invention is to provide a speed reducer in which one, two or more stages of speed reduction may be readily and reliably incorporated so that the unit may satisfy the speed requirements of any particular installation within a wide range.

Another object is to provide a speed reducer of simple and inexpensive design possessing the above noted characteristics.

Other more specific objects and advantages will appear, expressed or implied, from the following description of a speed reducer constructed in accordance with this invention.

In the accompanying drawings:

Figure 1 is a longitudinal sectional view of a speed reducer embodying the present invention and showing the same equipped with a double reduction gear train and structurally combined with a driving motor.

Figs. 2 and 3 are transverse sectional views taken along the lines 2—2 and 3—3, respectively, of Fig. 1.

Figs. 6, 7, 8 and 9 are diagrammatic views illustrating the arrangements of gears involved in single, double, triple and quadruple reduction gear trains, respectively.

Fig. 10 is a fragmentary sectional view illustrating a modified means for structurally combining an electric motor with the speed reducer shown in Fig. 1.

Figure 1:
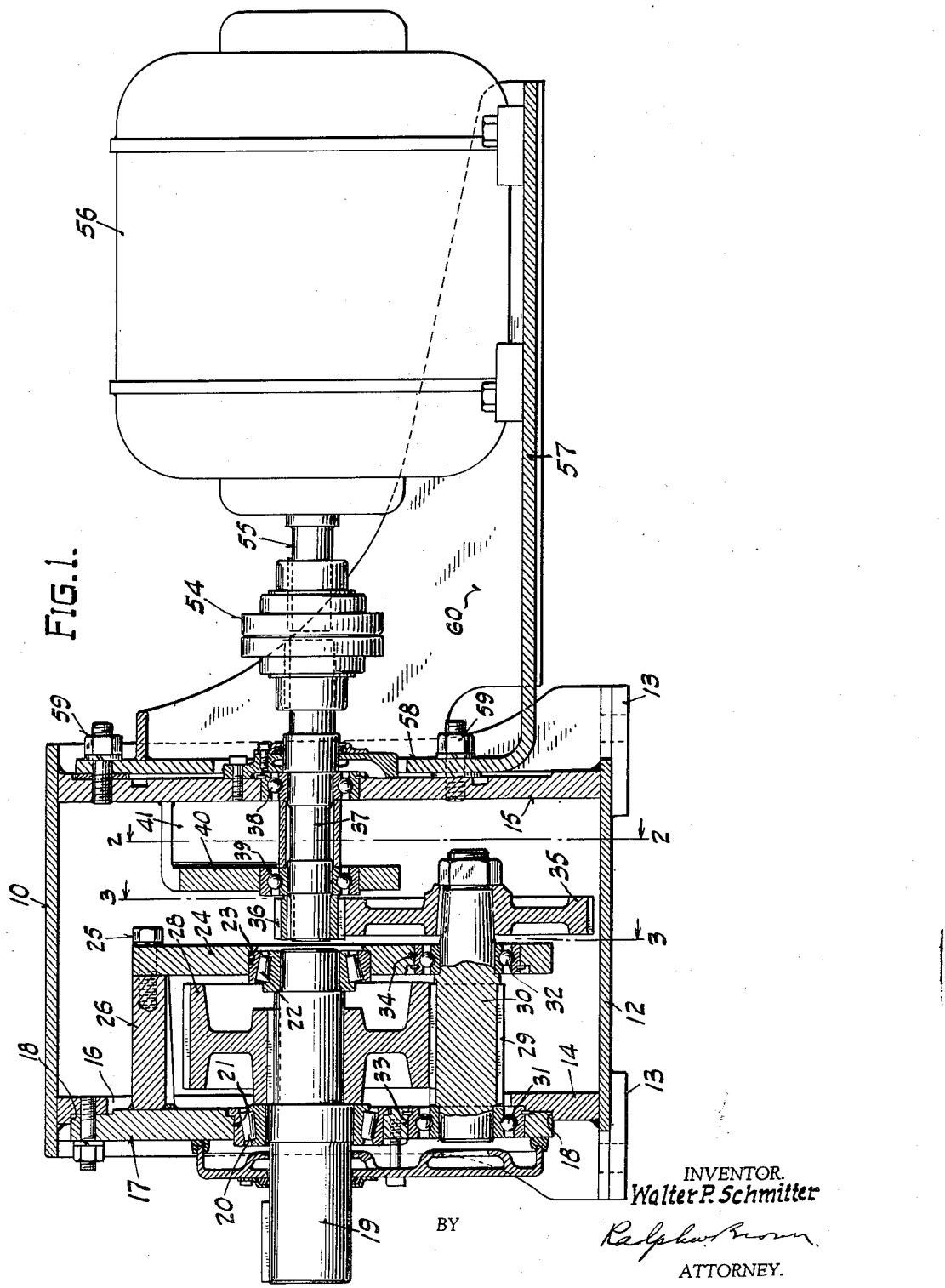

The speed reducer selected for illustration includes a welded steel housing comprising an arched cover portion 10 and integral sloping side wall portions 11 formed from a suitably bent metal sheet. A metal sheet 12 fitted between and welded to the side wall portions 11 along the lower edges thereof, constitutes the bottom of the housing which is equipped with suitable mounting feet 13 welded to the four corners thereof. Substantially flat metal plates 14 and 15, fashioned to snugly fit within and between the cover, side wall and bottom portions and welded thereto, constitute the end walls of the housing. A simple extremely rigid housing structure is thus provided which presents a good appearance and which may be inexpensively produced.

A large circular opening 16 formed in one of the end walls 14 affords access to the interior of the housing, this opening being normally closed by a removable metal disk 17 seated thereover and accurately centered by an encircling shoulder 18 machined in the outer face of the wall 14 in concentric relation to the opening 16.

The disk 17 provides support for a power output shaft 19 extending therethrough. In this instance the shaft 19 is shown journalled in a suitable bearing 20 seated within a central bore 21 provided in the disk 17 and also journalled in a suitable bearing 22 seated within a bore 23 in a plate 24 rigidly carried by the disk and spaced inwardly therefrom. The plate 24 is shown removably attached by screws 25 to three supporting lugs 26 welded to and projecting inwardly from the disk 17, each lug 26 having a dowel pin 27 therein engaged with the plate 24 to accurately position the same relative to the disk. By this arrangement the two bores 21 and 23, which are preferably simultaneously formed in the disk 17 and plate 24, coact through the bearings 20 and 22 to accurately position the shaft 19.

A gear 28 keyed or otherwise fixed to the shaft 19 meshes with a pinion 29 formed on a parallel shaft 30 disposed directly below the shaft 19. Shaft 30 is also rigidly and accurately supported in suitable bearings 31 and 32 fixed in aligned bores 33 and 34 preferably simultaneously formed in the disk 17 and plate 24, so as to insure an accurate meshing relation between the wide faced pinion 29 and gear 28. The shaft 30 extends through the plate 24 and is driven by a gear 35 keyed or otherwise fixed to the inner projecting end thereof.

It will be noted that the shaft and gearing thus far described are structurally combined with the disk 17 to form a self-contained sub-assembly removably attached to and accurately supported by the housing end wall 14 in a manner otherwise quite independent of the housing.

In Figs. 1, 2 and 3 the gear 35 meshes with a pinion 36 keyed or otherwise fixed to the projecting inner end of a shaft 37 supported by the other housing end wall 15. The shaft 37 is shown aligned with shaft 19 and journalled in longitudinally spaced bearings 38 and 39 respectively seated in the end wall 15 and in a supporting plate 40 rigidly mounted on and spaced inwardly from the latter. The plate 40 is disposed parallel to the wall 15 and preferably in an inclined position so as to clear the inner end of shaft 30 and at the same time afford support for additional gearing to be later described. In this instance the ends of the plate 40 are shown bent to provide integral end supports 41 which are welded to the wall 15, so as to leave a clear gap between the side margins of the plate 40 and the adjacent wall 15. The wall 15 and plate 40 are preferably simultaneously bored to receive the bearings 38 and 39 so as to insure accurate positioning of the shaft 37.

It will be noted that the gearing above described provides a double reduction in speed between the drive shaft 37 and driven shaft 19, the pinion 36 and gear 35 providing one stage of speed reduction while the pinion 29 and gear 28 provide a second stage. It will of course be understood that both the pinion 36 and gear 35 may be readily replaced by pinions and gears of other sizes, so as to vary the total speed reduction between the shafts 27 and 19. If the desired speed reduction is very small, the second reduction stage may be omitted by omitting the shaft 19 and gear 28, as indicated in Fig. 6, in which event the shaft 30 would be replaced by a shaft 30' extending through and beyond the disk 17.

Figure 4:
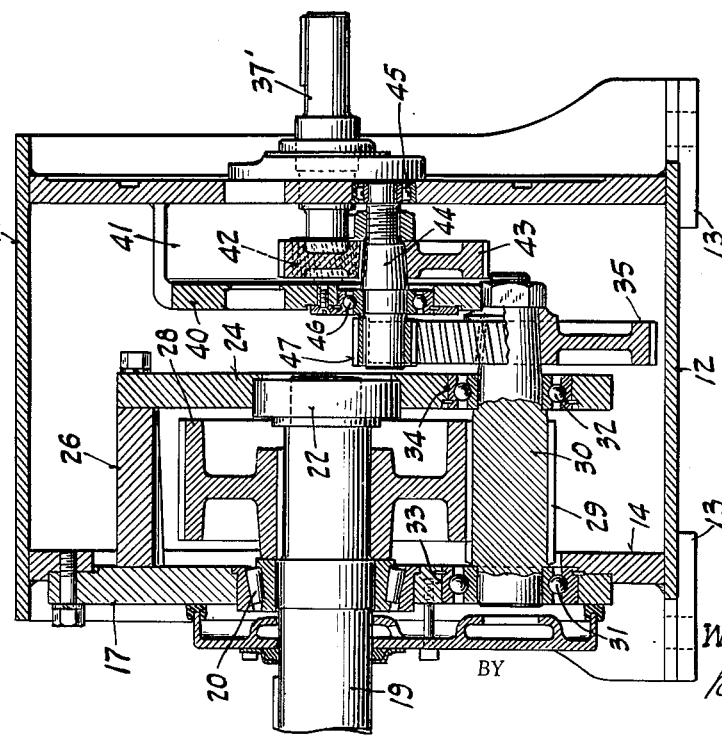

In order to provide a total speed reduction greater than is available with the double-reduction gearing shown in Fig. 1, the shaft 37' may be used in place of the shaft 37 of Fig. 1. Shaft 37' has a pinion 42 thereon arranged to mesh with a gear 43 on an additional shaft 44, as indicated in Figs. 4 and 8. For such an arrangement the housing end wall 15 and plate 40 are additionally bored preferably simultaneously to receive and support bearings 45 and 46 in which the additional shaft 44 is journalled. The pinion 42 and gear 43 are shown in Fig. 4 arranged between the end wall 15 and plate 40, the shaft 44 being extended through the latter to provide support for a pinion 47 positioned to mesh with the gear 35.

A triple reduction in speed is thus readily provided between the drive shaft 37' and driven shaft 19 in a satisfactory and reliable manner without requiring any material change in structural design.

Figure 5:
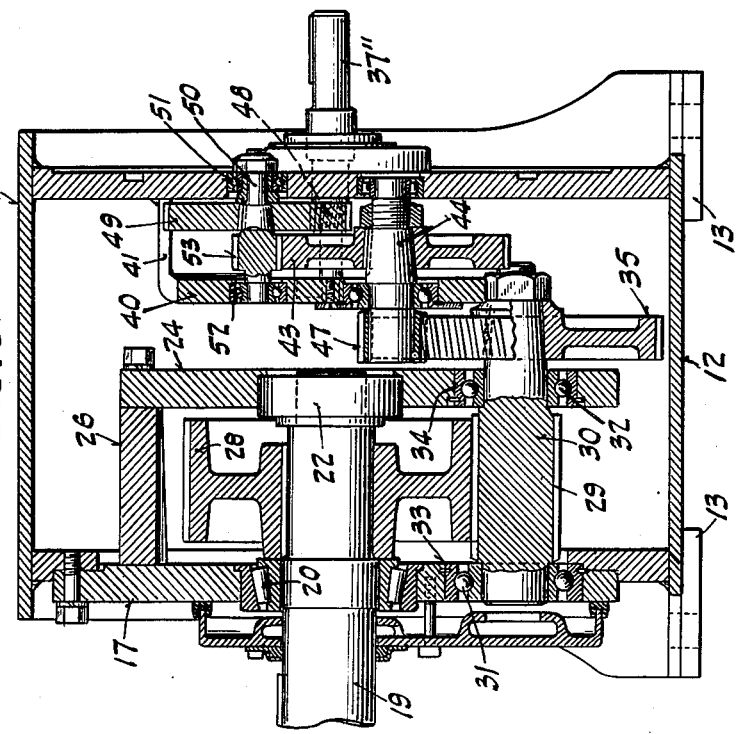
Figs. 4 and 5 are views similar to Fig. 1 showing the speed reducer equipped with a triple reduction and a quadruple-reduction gear train, respectively.

Moreover, by the arrangement shown in Figs. 5 and 9, a quadruple reduction in speed is also readily available for any installation wherein an even greater total speed reduction is required. In that arrangement a shaft 37" has been substituted for the shaft 37' of Fig. 4, the shaft 37" being equipped with a pinion 48 arranged to mesh with a gear 49 on an additional shaft 50. The housing end wall 15 and plate 40 are in this instance additionally bored, preferably simultaneously, to receive accurately aligned bearings 51 and 52 in which the shaft 50 is journalled. In this instance the shaft 50 is also provided with a pinion 53 arranged to mesh with the gear 43 on the shaft 44, the pinions and gears 48, 49, 53 and 43 being disposed within the space between the end wall 15 and plate 40. That end of the shaft 44 projecting beyond the plate 40 is equipped with a pinion 47 meshing with gear 35, as in the arrangement shown in Fig. 4.

From the foregoing it will be noted that a speed reducer has been provided capable of including one, two, three or four speed reduction stages and, regardless of the number of stages, each of the shafts therein is adequately supported in and accurately positioned by longitudinally spaced bearings in supports fixedly related to each other. Moreover, in each of the gear trains shown the parts are arranged for easy assembly and are readily accessible for inspection, replacement and repair, the gearing carried by the disk 17 being readily accessible before the latter is applied to or after it has been removed from the housing; and with the disk 17 removed, the supporting plate 40 and gearing supported thereby are readily accessible through the large opening 16 in the housing end wall 14. In the process of assembly the shaft or shafts and gearing, to be supported by the plate 40 and housing end wall 15, are usually first mounted in operative positions therein, with a pinion 36 or 47 arranged in an exposed position beyond the plate 40, and thereafter the disk 17 with its gearing is applied and fixed to the housing wall 14, thereby causing the gear 35 to assume a position in accurate meshing relation with the pinion 36 or 47.

The drive shaft 37, 37' or 37" of the speed reducer shown may be variously driven. In Fig. 1 shaft 37 is shown connected through a suitable flexible coupling 54 to the shaft 55 of a standard electric motor 56 carried by the speed reducer housing. In this instance the motor 56 is mounted on the floor plate 57 of a suitable bracket having an upright end plate 58 adapted to be attached by screws 59 or otherwise to the substantially flat housing end wall 15. The bracket shown is stiffened by suitable side plates 60 welded to the floor and end plates 58. Motors of different sizes are of course required to satisfy the horse power requirements of a given installation and the substantially flat formation of end wall 15 makes it possible to attach thereto a motor bracket of any of a number of sizes best suited to properly support and position a motor of the horse power required.

Another method of structurally combining an electric motor with the speed reducer hereinabove described is shown in Fig. 10. The motor 56' therein shown is equipped with a conventional end head mounting flange 61 bolted or otherwise rigidly attached to the housing end wall 15 and having a circular rib 62 engaged in a channel 63 formed in the end wall 15 to accurately center the motor. In this instance the motor shaft 64 projects through the end wall 15 and is rigidly connected in driving relation with the pinion 36.

A simple inexpensive driving connection between the pinion 36 and motor shaft 64 is provided which will readily accommodate motor shafts of various sizes and lengths and thereby avoid costly cutting or machining the shaft. The stub shaft 65 serves this purpose. The stub shaft is fashioned at one end to receive and key the pinion 36 thereto, and the other end is bored to a depth sufficient to accommodate the projecting end of the motor shaft and of a diameter to securely grip the motor shaft when shrunk onto it. A bearing 66 in the plate 40 affords additional support for the stub shaft 65 and pinion 36 to accurately position the latter.

Various changes may be made in any of the embodiments of the invention hereinabove specifically described without departing from or sacrificing the advantages of the invention as defined in the appended claims.

I claim:

1. In a gear set the combination of a housing having closure members at opposite ends thereof, a pair of spaced substantially parallel plates, each of said plates being carried by one of said members and spaced inwardly therefrom, a plurality of parallel shafts each journalled in one of said members and also journalled in the plate carried by the latter, intermeshing gears carried by said shafts between said last named member and plate, another shaft extending through and journalled in the other of said plates, and intermeshing gears respectively carried by said last named shaft and one of said first named shafts, said last named gears being disposed between said plates.

2. In a gear set the combination of a housing having closure members at opposite ends thereof, a pair of substantially parallel spaced plates each spaced inwardly from one of said members and extended crosswise thereof, a shaft journalled in one of said members and also journalled in one of said plates, another shaft journalled in the other of said members and also journalled in the other of said plates, and gearing between said plates operably connecting said shafts.

3. In a gear set the combination of a housing having substantially flat closure members at opposite ends thereof, a pair of substantially parallel plates spaced from each other and from said members and extended crosswise thereof, a shaft journalled in one of said members and in one of said plates and projecting through the latter, another shaft journalled in the other of said members and in the other of said plates and projecting through the latter, and intermeshing gears respectively fixed to the projetcing ends of said shafts between said plates.

4. In a gear set the combination of a housing having closure members at opposite ends thereof, a pair of spaced supports therein each spaced inwardly from one of said members, a shaft journalled in one of said members and in one of said supports and projecting through the latter, another shaft journalled in and extending through the other of said members and also journalled in and extending through the other of said supports, intermeshing gears respectively fixed to the projecting ends of said shafts, and a bracket removably attached to said last named member and having an extended floor plate for supporting a motor in driving relation with said last named shaft.

5. In a gear set the combination of a housing having closure members at opposite ends thereof, spaced supports therein each spaced inwardly from one of said members, a shaft journalled in one of said members and in one of said supports and projecting through the latter, a driving motor attached to the other of said members and having a shaft projecting therethrough, a stub shaft journalled in and projecting through the other of said supports, said last named shaft having a hollow portion shrunk onto said motor shaft, and intermeshing gears between said supports operatively connecting said last named shaft with said first named shaft.

6. In a gear set the combination of a housing having closure members at opposite ends thereof, a pair of substantially parallel plates spaced from each other and from said members, a shaft journalled in one of said members and in one of said plates and projecting through the latter, another shaft journalled in the other of said members and in the other of said plates and projecting through the latter, and intermeshing gears between said plates and fixed to the projecting ends of said shaft respectively, both of said plates being extended to permit journalling an additional shaft therein.

7. In a gear set the combination of a housing having closure members at opposite ends thereof, a pair of substantially parallel plates each carried by one of said members and spaced inwardly thereof, a plurality of parallel shafts journalled in each of said plates, intermeshing gears between each of said closure members and plate carried thereby for interconnecting each of said plurality of shafts, and intermeshing gears between said plates for connecting one of said plurality of shafts to the other plurality of shafts.

8. In a gear set the combination of a housing having closure members at opposite ends thereof, a pair of substantially parallel plates spaced apart and extended crosswise of and between said members, means at the ends of each of said plates for mounting the same on and in spaced relation to an adjacent member, a shaft supported by one of said members and by one of said plates and projecting through the latter, a second shaft supported by the other of said members and by the other of said plates and projecting through the latter, and intermeshing gears respectively mounted on the projecting ends of said shafts.

9. In a gear set the combination of a housing having closure members at opposite ends thereof, one of said members being removable to afford access to said housing, a pair of substantially parallel plates spaced apart and extended crosswise of and between said members, means at the ends of each of said plates for mounting the same on and in spaced relation to an adjacent member, a shaft journalled in one of said members and in one of said plates and projecting through the latter, a second shaft journalled in the other of said members and in the other of said plates and projecting through the latter, and a set of intermeshing gears disposed between said plates and respectively fixed to the projecting ends of said shafts.

10. In a gear set the combination of a housing having closure members at the opposite ends thereof, a driven shaft journalled in and projecting through one of said members, a plate extending crosswise of the other of said members, means at the opposite ends of said plate for mounting said plate on and in spaced relation to said other member so as to leave a clear gap between the side margins of said plate and said last named member, a drive shaft projecting through said last named member, and speed reduction gearing connecting said drive and driven shafts, said gearing including a gear disposed between said plate and said last named member.

WALTER P. SCHMITTER.

REFERENCES CITED

The following references are of record in the file of this patent:

UNITED STATES PATENTS

| Number | Name | Date |
| --- | --- | --- |
| 1,971,968 | Schmitter | Aug. 28, 1934 |
| 2,027,149 | Christian | Jan. 7, 1936 |
| 2,170,548 | Christian | Aug. 22, 1939 |

FOREIGN PATENTS

| Number | Country | Date |
| --- | --- | --- |
| 132,606 | Austria | Apr. 10, 1933 |